United States Patent
Fletcher et al.

(10) Patent No.: US 9,822,785 B2
(45) Date of Patent: Nov. 21, 2017

(54) TURBOCHARGER COMPRESSOR RECIRCULATION SYSTEM

(71) Applicants: David Fletcher, Flint, MI (US); Brian M. Graichen, Leonard, MI (US); James H. Miller, Ortonville, MI (US); Keith Hampton, Ann Arbor, MI (US); Matt Gilmer, Whitemore Lake, MI (US); Rex Bravo, Detroit, MI (US); Andrew Niedert, New Hudson, MI (US)

(72) Inventors: David Fletcher, Flint, MI (US); Brian M. Graichen, Leonard, MI (US); James H. Miller, Ortonville, MI (US); Keith Hampton, Ann Arbor, MI (US); Matt Gilmer, Whitemore Lake, MI (US); Rex Bravo, Detroit, MI (US); Andrew Niedert, New Hudson, MI (US)

(73) Assignee: Dayco IP Holdings, LLC, Troy, MI (US)

(*) Notice: Subject to any disclaimer, the term of this patent is extended or adjusted under 35 U.S.C. 154(b) by 435 days.

(21) Appl. No.: 14/566,246

(22) Filed: Dec. 10, 2014

(65) Prior Publication Data
US 2015/0159665 A1    Jun. 11, 2015

Related U.S. Application Data

(60) Provisional application No. 61/914,724, filed on Dec. 11, 2013.

(51) Int. Cl.
*F04D 27/02* (2006.01)
*F16K 15/18* (2006.01)
(Continued)

(52) U.S. Cl.
CPC ...... *F04D 27/0215* (2013.01); *F16K 11/0716* (2013.01); *F16K 15/18* (2013.01);
(Continued)

(58) Field of Classification Search
CPC .... F04D 27/0215; F16K 11/06; F16K 11/065; F16K 11/07; F16K 11/0716; F16K 15/18;
(Continued)

(56) References Cited

U.S. PATENT DOCUMENTS

| | | | |
|---|---|---|---|
| 1,845,969 A | 2/1932 | Hueber | |
| 1,924,325 A | 8/1933 | Kramer | |

(Continued)

FOREIGN PATENT DOCUMENTS

| | | |
|---|---|---|
| CN | 101910603 | 12/2010 |
| CN | 201714522 | 1/2011 |

(Continued)

OTHER PUBLICATIONS

PCT, International Search Report and Written Opinion, International Application No. PCT/US2014/069526 (dated Mar. 10, 2015).
(Continued)

*Primary Examiner* — Nathaniel Wiehe
*Assistant Examiner* — Brian O Peters
(74) *Attorney, Agent, or Firm* — FisherBroyles, LLP; Susan M. Oiler (57) ABSTRACT

Recirculation systems for engine intake air are disclosed having a turbocharger compressor with an inlet and an outlet, a recirculation pathway connecting fluid flow from the outlet of the turbocharger compressor to fluid flow into the inlet of the turbocharger compressor, and a recirculation valve assembly controlling fluid flow through the recirculation pathway. The recirculation valve assembly includes an actuator operating a valve coupled to an aspirator assembly that produces vacuum when the fluid flows through the (Continued)

recirculation pathway from the inlet to the outlet and when fluid flows through the recirculation pathway from the outlet to the inlet. Fluid flows through the recirculation pathway from the outlet to the inlet when the turbocharger generates boost. The vacuum generated by the aspirator assembly is in fluid communication with the actuator to move the valve between two or more positions.

20 Claims, 6 Drawing Sheets (51) Int. Cl.
*F04D 19/00* (2006.01)
*F16K 11/07* (2006.01)

(52) U.S. Cl.
CPC ..... *F05D 2220/40* (2013.01); *Y10T 137/8733* (2015.04); *Y10T 137/8741* (2015.04)

(58) Field of Classification Search
CPC ......... Y10T 137/7771; Y10T 137/7779; Y10T 137/8733; Y10T 137/8741; F04F 5/16; F04F 5/20; F04F 5/22
USPC ............................... 137/493, 493.8; 417/190
See application file for complete search history.

(56) References Cited

U.S. PATENT DOCUMENTS

| | | | |
|---|---|---|---|
| 3,234,932 A | 2/1966 | Bird et al. | |
| 3,754,841 A | 8/1973 | Grabb et al. | |
| 4,010,928 A | 3/1977 | Smith | |
| 4,211,200 A | 7/1980 | Rocchio et al. | |
| 4,446,887 A | 5/1984 | Redmon et al. | |
| 4,499,034 A | 2/1985 | McAllister | |
| 4,519,423 A | 5/1985 | Ho et al. | |
| 4,554,786 A | 11/1985 | Takeuchi et al. | |
| 5,108,266 A | 4/1992 | Hewitt | |
| 5,188,141 A | 2/1993 | Cook et al. | |
| 5,291,916 A | 3/1994 | Kloosterman et al. | |
| 5,816,446 A | 10/1998 | Steindorf et al. | |
| 6,035,881 A | 3/2000 | Emmerich et al. | |
| 6,089,019 A * | 7/2000 | Roby | F02M 26/51 123/568.11 |
| RE37,090 E | 3/2001 | Kloosterman et al. | |
| 6,220,271 B1 | 4/2001 | Emmerich et al. | |
| 7,529,614 B1 | 5/2009 | Muller | |
| 7,722,132 B2 | 5/2010 | Carlsson | |
| 8,302,402 B2 | 11/2012 | Boley et al. | |
| 9,103,288 B2 | 8/2015 | Pursifull | |
| 2006/0016477 A1 | 1/2006 | Zaparackas | |
| 2008/0007113 A1 | 1/2008 | Choi | |
| 2008/0121480 A1 | 5/2008 | Kawamori et al. | |
| 2011/0132311 A1 | 6/2011 | Pursifull et al. | |
| 2011/0186151 A1 | 8/2011 | Sparazynski | |
| 2012/0256111 A1 | 10/2012 | Hoang et al. | |
| 2013/0213510 A1 | 8/2013 | Burnham et al. | |
| 2013/0233276 A1 | 9/2013 | Pursifull et al. | |
| 2013/0233287 A1 | 9/2013 | Leone | |
| 2015/0159677 A1* | 6/2015 | Hampton | F04F 5/20 417/182 |

FOREIGN PATENT DOCUMENTS

| | | |
|---|---|---|
| DE | 4310761 | 10/1994 |
| FR | 2 929 663 | 10/2009 |
| GB | 2129516 | 5/1984 |
| JP | 2009-138722 | 6/2009 |

OTHER PUBLICATIONS

U.S., Non-Final Office Action; U.S. Appl. No. 14/294,727 (dated Oct. 8, 2015).
U.S., Final Office Action; U.S. Appl. No. 14/294,727 (dated Apr. 22, 2016).
CN, Office Action and Search Report with English translation; Chinese Patent Application No. 201480002110.X; 9 pages (dated Feb. 22, 2017).
PCT, International Search Report and Written Opinion, International Application No. PCT/US2014/041250 (dated Oct. 27, 2014).
CN, Office Action and Search Report with English translation; Chinese Patent Application No. 201410413220.7; (dated Nov. 14, 2016).
EP, Supplementary European Search Report; Patent Application No. 14811266.7; 5 pages (dated Apr. 5, 2017).

* cited by examiner

TURBOCHARGER COMPRESSOR RECIRCULATION SYSTEM

RELATED APPLICATIONS

This application claims the benefit of U.S. Provisional Application No. 61/914,724, filed Dec. 11, 2013, which is incorporated by reference herein in its entirety.

TECHNICAL FIELD

This application relates to turbocharger compressor recirculation systems, more particularly to such systems having a compressor recirculation valve assembly incorporating an aspirator assembly that generates vacuum for fluid flow in both directions through the recirculation system.

BACKGROUND

Turbocharged engines require compressor recirculation valves ("CRV") to control the speed of the compressor. The size, mass, and power consumption of electrically operated poppet valve style CRVs are a limitation. There is a need for a CRV that is lighter, smaller, and consumes less electrical power.

SUMMARY

Recirculation systems for engine turbocharger compressors are disclosed herein. In one aspect, a recirculation system includes a turbocharger compressor having an inlet and an outlet, a recirculation pathway connecting fluid flow from the outlet of the turbocharger compressor to fluid flow into the inlet of the turbocharger compressor, and a recirculation valve assembly controlling fluid flow through the recirculation pathway. The recirculation valve assembly includes an electropneumatic actuator operating a valve coupled to an aspirator assembly that produces vacuum when fluid flows through the recirculation pathway from the inlet to the outlet and when fluid flows through the recirculation pathway from the outlet to the inlet. The vacuum generated by the aspirator assembly may be in fluid communication with a device requiring vacuum.

In another aspect of a system, the fluid flow through the recirculation pathway from the outlet to the inlet may occur when the turbocharger compressor generates boost. In another aspect, the vacuum produced during boost may actuate the electropneumatic actuator to move the valve to a closed position. The device requiring vacuum may be the electropneumatic actuator.

In another aspect, a system further includes a reservoir in fluid communication with the aspirator assembly and the electropneumatic actuator, wherein the reservoir stores vacuum for selective activation of the electropneumatic actuator. The recirculation system may also include a control valve disposed between the reservoir and the electropneumatic actuator. The control valve may be activatable by an engine computer on demand to apply vacuum to the electropneumatic actuator to operate the valve. The reservoir may store vacuum when the fluid flow is from the inlet to the outlet and also when the fluid flow is from the outlet to the inlet.

In another aspect, the electropneumatic actuator is actuated by less than 1 ampere of current.

In another aspect, a recirculation system includes a recirculation pathway having a first selectable portion with a first aspirator and a second selectable portion with a second aspirator. The first aspirator may create vacuum for fluid flow from the outlet to the inlet, and the second aspirator may create vacuum for fluid flow from the inlet to the outlet. The valve is operable to select fluid flow through the first selectable portion or the second selectable portion. In another aspect, the valve may be a three-way valve having a first open position to direct fluid flow through the first selectable portion, a second open position to direct fluid flow through the second selectable portion, and a closed position.

In another aspect, a system includes a first check valve in the first selectable portion of the recirculation pathway to prevent fluid flow into the first selectable portion when the valve directs flow through the second selectable portion and a second check valve in the second selectable portion of the recirculation pathway to prevent fluid flow through the second selectable portion when the valve directs flow through the first selectable portion.

In another aspect, the valve is integrated into the aspirator assembly and is translatable between at least a first position and a second position that each provide a Venturi effect, but in opposite directions of flow through the aspirator assembly. The valve may include a gate having a first bore and a second bore. The first bore has a Venturi opening that produces vacuum when the fluid flows from the inlet to the outlet, and the second bore has a Venturi opening that produces vacuum when the fluid flows from the outlet to the inlet. The electropneumatic actuator operates to move the gate to place the first bore or the second bore, as selected, into alignment with the recirculation pathway to define the first position and the second position of the valve. The first bore and the second bore of the gate may taper to be part of a Venturi tube of the aspirator assembly.

In another aspect, a recirculation system includes a turbocharger compressor having an inlet and an outlet; a recirculation pathway connecting fluid flow from the outlet of the turbocharger compressor to fluid flow into the inlet of the turbocharger compressor; and a recirculation valve assembly controlling fluid flow through the recirculation pathway. The recirculation valve assembly includes a housing defining a fluid passageway therethrough, the fluid passageway having a first tapering portion gradually tapering from a larger internal opening to a smaller internal opening and a second tapering portion gradually tapering from a larger internal opening to a smaller internal opening. The first tapering portion and the second tapering portion converge toward one another with their smaller internal openings facing one another. The recirculation valve assembly includes a gate positioned between and in fluid communication with the first tapering portion and the second tapering portion of the housing, the gate having a first bore therethrough that includes a Venturi opening within a portion of the first bore that creates vacuum when fluid flows through the first bore and a second bore therethrough that includes a Venturi opening within a portion of the second bore that creates vacuum when fluid flows through the second bore. The recirculation system also includes an electropneumatic actuator coupled to the gate, the actuator operable to move the gate to place the first bore or the second bore, as selected, into alignment with the smaller internal openings of the first and second tapering portions. The vacuum generated by the aspirator assembly may be in fluid communication with a device requiring vacuum.

In another aspect, a valve assembly includes a first flow path having a first aspirator that creates vacuum for fluid flow through the first flow path, a second flow path having a second aspirator that creates vacuum for fluid flow through the second flow path, and a valve in fluid communication with an inlet, the first flow path, and the second flow path. The valve assembly may also have an actuator coupled to the valve and operable to actuate the valve to place the first flow path or the second flow path, as selected, into fluid communication with the inlet. The vacuum generated by either the first aspirator or the second aspirator may be in fluid communication with a device requiring vacuum.

DETAILED DESCRIPTION

The following detailed description will illustrate the general principles of the invention, examples of which are additionally illustrated in the accompanying drawings. In the drawings, like reference numbers indicate identical or functionally similar elements.

As used herein "fluid" means any liquid, suspension, colloid, gas, plasma, or combinations thereof.

In some vehicles vacuum is used to operate or assist in the operation of various devices. For example, vacuum may be used to assist a driver applying vehicle brakes, turbocharger operation, fuel vapor purging, heating and ventilation system actuation, and driveline component actuation, including actuation of valves. If the vehicle does not produce vacuum naturally, such as from the intake manifold, then a separate vacuum source is required to operate such devices. While an aspirator or an ejector can produce vacuum when supplied with either boost or manifold vacuum, the depth of vacuum produced will be a function of the motive pressure. However, in boosted engines where intake manifold pressures are often at pressures greater than atmospheric pressure, intake manifold vacuum may be replaced or augmented with vacuum from an ejector. An "ejector," as used herein, is a converging, diverging nozzle assembly connected to a pressure source above atmospheric pressure.

Figure 1:
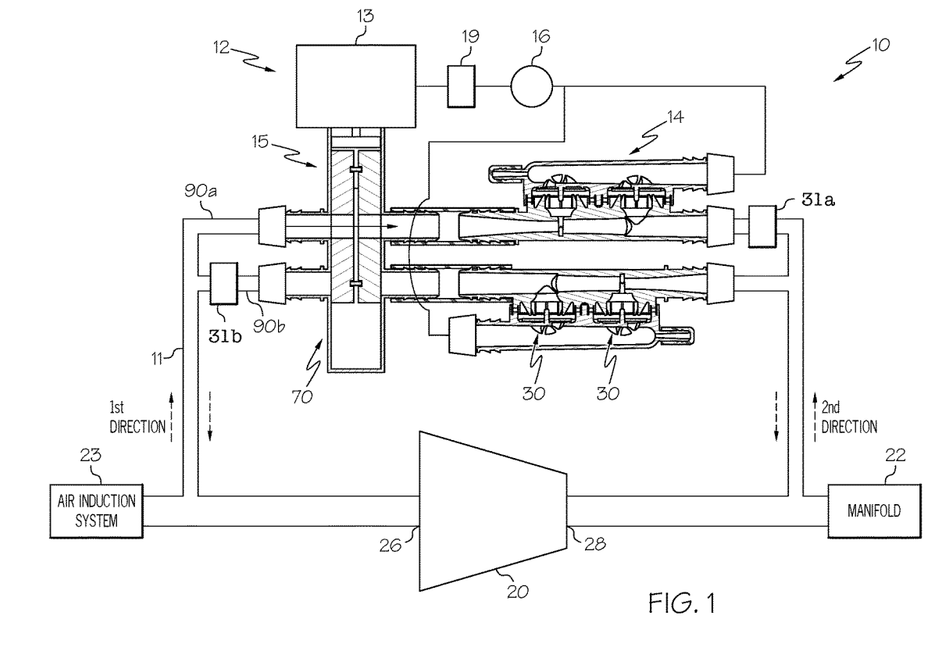
FIG. 1 is a schematic illustration of a system configuration that includes a turbocharger compressor with a recirculation pathway that includes a first embodiment of a recirculation valve assembly.
Figure 5:
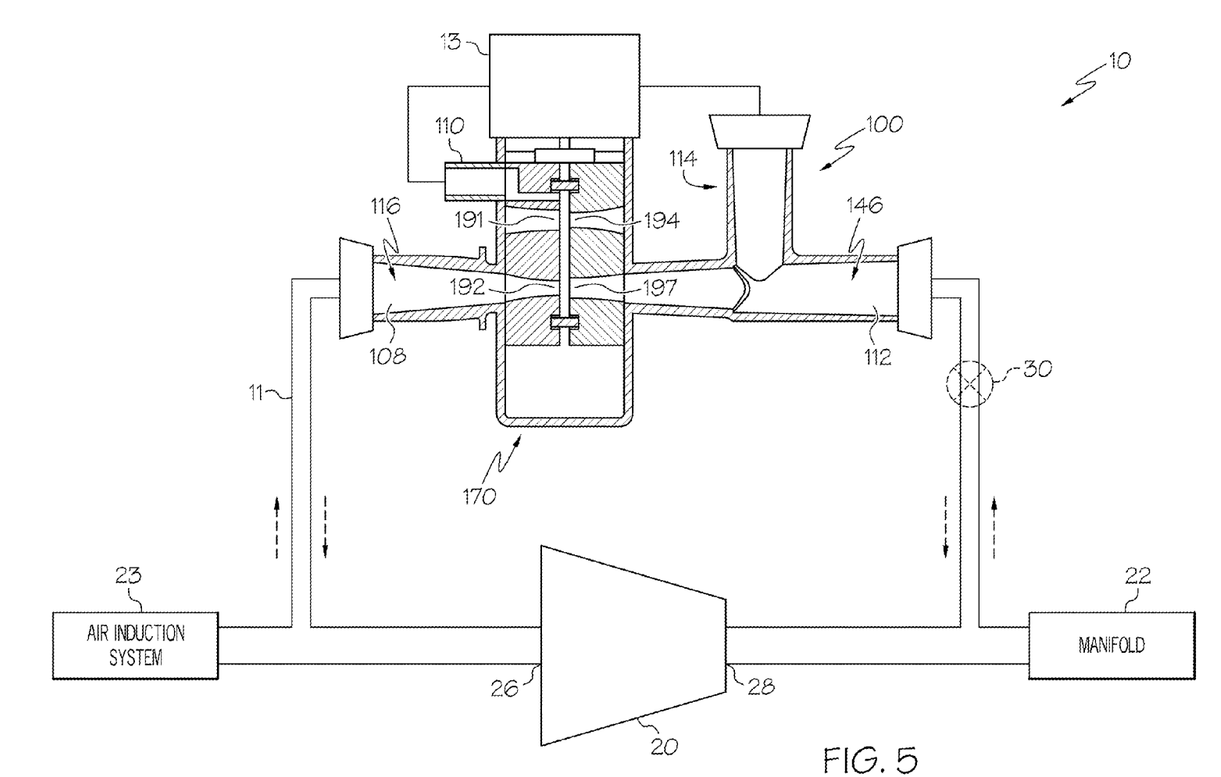
FIG. 5 is a schematic illustration of a system configuration that includes a turbocharger compressor with a recirculation pathway that includes a second embodiment of a recirculation valve assembly.

FIGS. 1 and 5 both illustrate at least a portion of an engine system, generally designated as reference number 10, having a turbocharger compressor 20 with fluid flow from its outlet 28 connected to the fluid flow into its inlet 26 by a recirculation pathway 11 that includes a recirculation valve assembly 12. The recirculation valve assembly 12 controls fluid flow through the recirculation pathway 11 in a first direction, from the air induction system 23 toward the intake manifold 22, and in a second direction that is an opposite direction from the first direction. The recirculation valve assembly 12 includes an electropneumatic actuator 13 operating a valve 15 coupled to an aspirator assembly 14 configured to produce vacuum when the fluid flow through the recirculation pathway is from the inlet to the outlet, the first direction, and to produce vacuum when the fluid flow is through the recirculation pathway from the outlet to the inlet, the second or opposite direction. The systems 10 illustrated in FIGS. 1 and 5 may also include one or more check valves 30 (optional; see FIGS. 5-8) as components of the aspirator assembly 14, as separate components of the system (check valves 31a, 31b in FIG. 1), or both. The systems 10 may include a vacuum canister 16 and a control valve 19, both of which are shown only in FIG. 1. The engine systems 10 may also include a throttle control (not shown) disposed in the fluid stream between the manifold 22 and the turbocharger compressor 20.

The electropneumatic actuator 13 may include a solenoid, as well as being pneumatically activated by the vacuum generated by the aspirator assembly 14. Examples of solenoid powered electropneumatic actuators are disclosed in co-pending U.S. application Ser. No. 13/921,473, filed Jun. 19, 2013 VARIABLE FLOW VALVE FOR TURBO-CHARGERS and co-pending U.S. application Ser. No. 14/473,151, filed Aug. 29, 2014 SOLENOID POWERED GATE VALVE, both of which are herein incorporated by reference in their entirety.

The valve 15, in FIGS. 1-4, includes a gate assembly 70, which may be referred to herein as a sprung gate, that includes a first gate member 72, a second gate member 74, (collectively referred to as gate 75) and a biasing member received therebetween. The biasing member may be an endless elastic band 76, spring (not shown), or other type of biasing member. FIGS. 1-4 show the biasing member as an endless elastic band 76, which may be described as being sandwiched between the first and second gate members 72, 74. Each gate member 72, 74 includes a track 78, 79, respectively, as a portion of the surface facing the other gate member (herein referred to as the inner surfaces 73, 77). Each track 78, 79 has received therein (has seated therein) a portion of the endless elastic band 76. The endless elastic band 76 is a biasing member that biases the first and second gate members 72, 74 away from one another and as such biases their respective outer surfaces against the opposing interior walls of the gate passageway 80 defined by the gate housing 71. The biasing force of the endless elastic band 76 may be a result of compression of the endless elastic band 76 between the first and the second gate members 72, 74.

The endless elastic band 76 may be generally oval shaped. The endless elastic band 76 is received in the tracks 78, 79 of the first and second gate members 72, 74 with the first side 82 received in one track 78 and the second side 83 received in the other track 79. When the endless band 76 is seated in the tracks 78, 79, the first and the second gate members 72, 74 are spaced apart from one another by a distance D to define a gap. The gap enables fluid to flow against the endless elastic band 76, which is radially expandable, to expand the endless elastic band 76 radially outward to form a seal between the outer perimeter of the endless elastic band 76 and a portion of the tracks 78, 79 in the first and second gate members 72, 74 as fluid flows through the gate 75 when it is in an open position, such as the first open position illustrated in FIG. 2 and the second open position illustrated in FIG. 4. This sealing engagement reduces or prevents fluid leakage into the electropneumatic actuator 13, which makes the gate 75 more leak resistant. The tracks 78,79 are positioned to inset the endless elastic band 76 a distance from the outer perimeter of the first and second gate members 72, 74 as well. Examples of gate assemblies having two gate members with an endless elastic band therebetween are described in co-pending U.S. application Ser. No. 14/473,151, which was incorporated by reference above.

The endless elastic band 76 also provides a gate that is less sensitive to manufacturing tolerances, in particular with respect to the dimensions of gate passageway 80. The gate passageway 80 is typically formed to have a width that is smaller than the unloaded width of the gate 75. Accordingly, the endless elastic band 76 becomes compressed between the first and second gate members 72, 74 as the gate 75 is inserted into the gate passageway 80 (or pocket). The endless elastic band's biasing action on the first and second gate members 72, 74 when inserted (wedged) into the pocket 80 biases each respective gate member into a sealing engagement with a wall of the pocket to reduce or prevent leaks.

Figure 2:
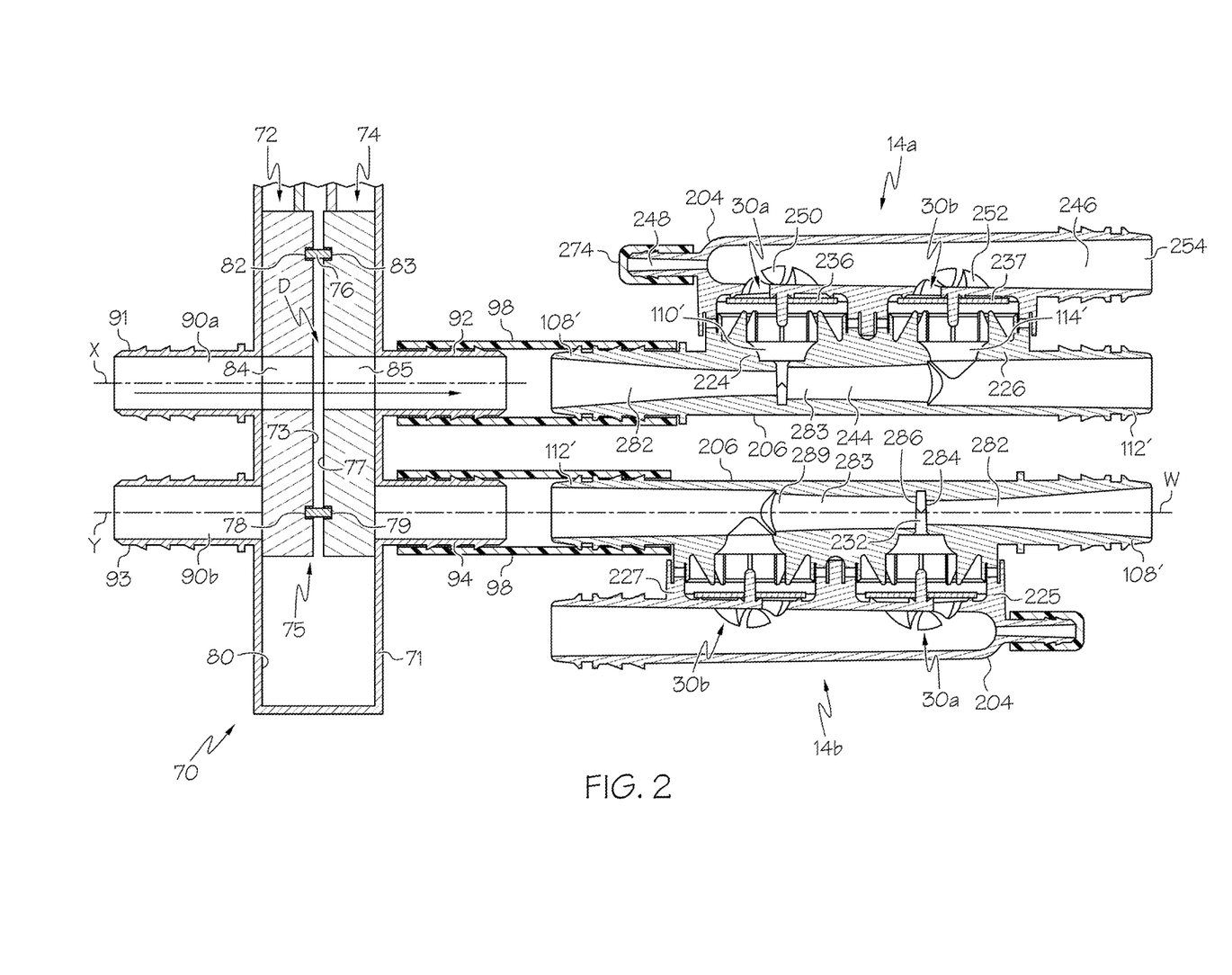
FIG. 2 is an enlarged, longitudinal cross-sectional view of a portion of the recirculation valve assembly from FIG. 1 showing the valve in a first open position.

As shown in FIG. 1, the recirculation pathway 11 may have a recirculation valve assembly 12 that includes an actuator 13, a valve 15, and an aspirator assembly 14. In one embodiment, the recirculation valve assembly 12 includes two flow paths, a first flow path and a second flow path, that allow creation of vacuum for fluid flow through the recirculation pathway 11 in both directions (i.e., the first direction from the inlet 26 to the outlet 28 of compressor 22 and the second direction from the outlet 28 to the inlet 26 of compressor 22). For ease of illustration, the first flow path and second flow path are shown in FIG. 2 as upper conduit 90a and lower conduit 90b. The first flow path and second flow path may also be referred to herein as a first selectable portion of the recirculation pathway 11 and a second selectable portion of the recirculation pathway 11, in the alternative.

Figure 3:
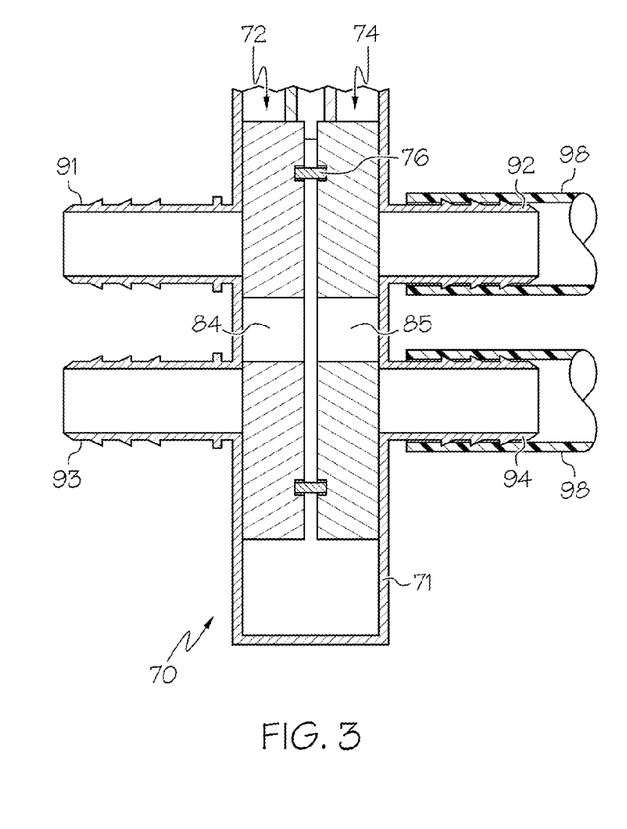
FIG. 3 is an enlarged, longitudinal cross-sectional view of the valve portion only of the recirculation valve assembly of FIGS. 1 and 2 showing the valve in a closed position.
Figure 4:
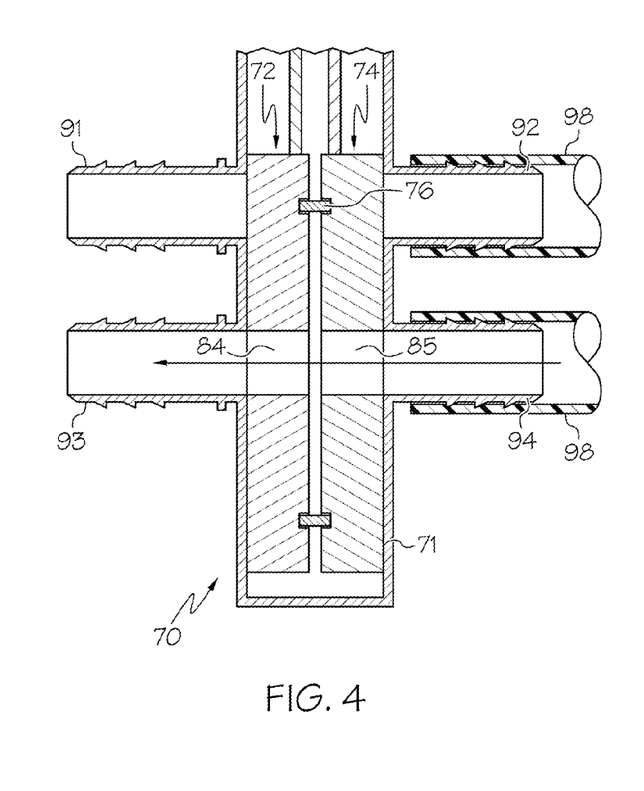
FIG. 4 is an enlarged, longitudinal cross-sectional view of the valve portion only of the recirculation valve assembly of FIGS. 1 and 2 showing the valve in a second open position.

As illustrated in FIGS. 1-4, the valve 15 is in fluid communication with the upper conduit 90a (first flow path) and the lower conduit 90b (second flow path), and each of the upper conduit 90a and the lower conduit 90b are in fluid communication with the inlet 26 of the compressor 22. As shown in FIGS. 2-4, the gate 75 of the valve 15 has a bore 84, 85 therethrough that is oriented to pass through the gate 75 horizontally as oriented relative to the page upon which the figures are printed. The gate 75 is translatable within the gate passageway 80 of the gate housing 71 so that the bore 84, 85 of the gate 75 may be positioned in a first position to place the first flow path in communication with the inlet 26 of the compressor 22 or in a second position to place the second flow path in communication with the inlet 26 of the compressor 22.

The gate 75 may include a first gate member 72 and a second gate member 74. The first gate member 72 includes a bore 84 therethrough that is aligned with a bore 85 in the second gate member 74 when gate 75 is assembled. The bores 84, 85 are oriented to pass through each respective gate member 72, 74 horizontally and each has a central longitudinal axis that is parallel to a longitudinal axis X of the upper conduit 90a and is parallel to a longitudinal axis Y of lower conduit 90b that both intersect the gate passageway 80. The upper conduit 90a may include a left male member 91 (first inlet) and a right male member 92 (first outlet) extending from the gate passageway 80. Similarly, the lower conduit 90b may include a left male member 93 (second inlet) and a right male member 94 (second outlet) extending from the gate passageway 80.

The bores 84, 85 in the assembled gate 75 are alignable with the upper conduit 90a as shown in FIG. 2 to define the first selectable portion (first flow path) of the recirculation pathway 11 that passes through the gate 75 and into a first aspirator 14a. The bores 84, 85 in the assembled gate 75 are also alignable with the lower conduit 90b as shown in FIG. 4 to define the second selectable portion (second flow path) of the recirculation pathway 11 that passes through a second aspirator 14b. The gate 75 is movable by the electropneumatic actuator between the first open position of FIG. 2 and the second open position of FIG. 4 to select whether fluid flow is through the first selectable portion of the recirculation pathway 11, i.e., through the upper conduit 90a and the first aspirator 14a, or fluid flow is through the second selectable portion of the recirculation pathway 11, i.e., through the lower conduit 90b and the second aspirator 14b. The upper conduit 90a and the lower conduit 90b, are illustrated in FIG. 2 as being connected to the first aspirator 14a and the second aspirator 14b, respectively, by hoses 98 or other connectors providing fluid communication between the components. The first aspirator 14a may generate vacuum when air flows through the recirculation pathway 11 in the first direction. The second aspirator 14b may be an ejector that generates vacuum when air flows through the recirculation pathway 11 in the second direction from the intake manifold 22 to the air induction system 23.

The aspirator assembly 14, as shown in FIGS. 1 and 2, includes a first aspirator-check valve assembly 14a, also referred to simply as the first aspirator, and a second aspirator-check valve assembly 14b, also referred to simply as the second aspirator. The first and second aspirators 14a, 14b as illustrated have the same construction, but the second aspirator is disposed in the recirculation pathway 11 in an opposite orientation relative to the first aspirator. Accordingly, the first aspirator 14a has its motive port 108' coupled for fluid communication with the upper conduit 90a, in particular its right male member 92, and the second aspirator 14b has its discharge port 112' coupled for fluid communication with the lower conduit 90b, in particular its right male member 94. In this embodiment, the first aspirator 14a and the second aspirator 14b are the same, but in other embodiments the aspirators could be different (i.e., by having different Venturi opening geometries to produce different mass flow rates through the aspirators or create different vacuum pressures). The construction of the first and second aspirators 14a, 14b may be as disclosed in co-pending U.S. application Ser. No. 14/509,612, filed Oct. 8, 2014, herein incorporated by reference in its entirety.

Since both aspirators in FIG. 2 are the same, components will be labeled collectively on both aspirators to provide more space and clarity for reference lines and numbers. The aspirators 14a, 14b include an upper housing portion 204 and a lower housing portion 206. The designations of upper and lower portions are relative to the drawings as oriented on the page, for descriptive purposes, and are not limited to the illustrated orientation when utilized in an engine system. Preferably, upper housing portion 204 is joined to lower housing portion 206 by sonic welding, heating, or other conventional methods for forming an airtight seal therebetween. Lower housing portion 206 defines passageway 244 which includes a plurality of ports, some of which are connectable to components or subsystems of the engine. The ports include: (1) a motive port 108', which supplies clean air from the engine intake air cleaner or air induction system 23 (FIG. 1), typically obtained upstream of the turbocharger compressor; (2) a suction port 110', which may connect via the check valve 30a to a device requiring vacuum such as the electropneumatic actuator 13; (3) a discharge port 112', which is connected to an engine intake manifold 22, typically downstream of the throttle of the engine; and, optionally, (4) a bypass port 114'. The bypass port 114' may be connected to the electropneumatic actuator 13 and, optionally, may include a check valve 30b in the fluid flow path therebetween. As shown in FIGS. 1 and 2, the lower housing portions 206 include lower valve seats 224, 226. A bore is defined in each lower valve seat 224, 226 to allow for air flow communication with air passageway 244. The details of the valve seats 224, 226 and the remainder of the components defining the check valves 30a and 30b are as disclosed in co-pending U.S. application Ser. No. 14/509,612, which was incorporated herein by reference above.

Referring again to FIG. 2, the upper housing portion 204 is configured for mating to or with the lower housing portion 206 to form the check valves 30a, 30b, if both are present. Upper housing portion 204 defines passageway 246 extending the length thereof and defines a plurality of ports, some of which are connectable to components or subsystems of the engine. The ports include: (1) a first port 248 that may be capped with cap 274 or may be connected to a component or subsystem of the engine; (2) a second port 250 in fluid communication with the suction port 110' in the lower housing portion 206, and between which a seal member 236 of the check valve 30a is disposed; (3) a third port 252 in fluid communication with the bypass port 114' in the lower housing portion 206, and between which the seal member 237 of the check valve 30b is disposed; and (4) a fourth port 254 which may function as an inlet connecting the aspirator-check valve assembly to a device requiring vacuum such as a vacuum canister 16 and/or the electropneumatic actuator 13. The upper housing portion 204 includes upper valve seats 225, 227. The details of the upper valve seats 225, 227 and the remainder of the components defining the check valves 30a and 30b are as disclosed in co-pending U.S. application Ser. No. 14/509,612, which was incorporated herein by reference above.

The first and second aspirators 14a, 14b are able to generate vacuum using the Venturi effect. In the lower housing portion 206, the passageway 244 includes a first tapering portion 282 that has a central longitudinal axis W (labeled in FIG. 2) coupled to a second tapering portion 283. The first tapering portion 282 continuously tapers from a larger inlet end at the motive port 108' to a smaller outlet end 284 at a Venturi opening 232, and the second tapering portion 283 continuously, gradually tapers from an inlet end 286 at the Venturi opening 232 to a larger outlet end 289. Each inlet and outlet may have a shape that is circular, elliptical, rectangular, or other polygonal shape and the gradually, continuously tapering inner profile extending therefrom may define, but is not limited to, a hyperboloid or a cone. The respective size of the inlet at the motive port 108' and the outlet 284 determine how much speed the fluid (typically, air) gains as it travels through the aspirators 14a, 14b. Some example configurations for the outlet end 284 and the inlet end 286 are presented in FIGS. 4-6 of co-pending U.S. application Ser. No. 14/294,727, filed Jun. 3, 2014, incorporated herein by reference in its entirety.

The venturi opening 232 is in fluid communication with the suction port 110', and at this junction the second tapering portion 283 begins and extends away from the first tapering portion 282. The second tapering portion 283 is also in fluid communication with the suction port 110'. The second tapering portion 283 then forms a junction with the bypass port 114' proximate the outlet end 289 of the second tapering portion 283 and is in fluid communication therewith. The first and second tapering portions 282, 283 typically share the central longitudinal axis W.

Referring again to FIG. 1, the recirculation valve assembly 12 may include a vacuum canister 16 (reservoir or vacuum reservoir) in fluid communication with the first aspirator 14a, the second aspirator 14b, and the actuator 13. The vacuum canister 16 may store vacuum produced by the first and second aspirators 14a, 14b for selective activation of the actuator 13 by an engine computer (not shown). The recirculation valve assembly 12 may also include the control valve 19, which may be, but is not limited to, one or more of the configurations disclosed in co-pending U.S. application Ser. Nos. 14/154,268, filed Jan. 14, 2014 and 14/277,815, filed May 15, 2014, both of which are herein incorporated by reference in their entirety. The vacuum canister 16 is preferably connected to a control port of the control valve 19 that is in fluid communication with an internal chamber that affects the opening and closing of the valve portion of the control valve 19. Other control ports of the control valve 19 may be connected to other portions of the system 10 to provide additional pneumatic control to other devices requiring vacuum (not shown).

With respect to FIGS. 1-4, in operation, the aspirators 14a, 14b generate the vacuum that the electropneumatic actuator 13 uses to move the gate 75 between the first open position of FIG. 2, the closed position of FIG. 3, and the second open position of FIG. 4. When the engine manifold pressure is below the atmospheric air pressure in the air induction system 23, the check valve 30a opens and allows air/fluid flow through the recirculation pathway 11 in the first direction (the non-recirculation direction) through the first aspirator 14a to produce vacuum, which may be stored in the vacuum canister 16 or which may directly actuate the electropneumatic actuator 13. When the turbocharger compressor operates to generate boost for the engine, the gate 75 is moved to the second open position, check valve 30a closes, and check valve 30b opens to provide for air flow in the second direction (recirculation of air from the turbocharger compressor) through second aspirator 14b, which again generates vacuum. Second aspirator 14b may also be referred to as an ejector that generates vacuum when the motive air pressure is greater than atmospheric pressure. The vacuum generated is used to move the gate 75 to the closed position shown in FIG. 3. When the gate 75 is placed into the second open position (FIG. 4), the outlet of the turbocharger compressor is in fluid communication with the inlet and air flows in that direction thereby limiting the boost pressure entering the manifold. If the gate is moved to the closed position of FIG. 3, the air flow generated by the turbocharger compressor flows into the manifold, i.e., the engine.

Additionally, since the system includes a control valve 19, when the engine computer demands that the valve is closed, the control valve is opened to provide vacuum from the vacuum canister to move the gate 75 into a closed position.

Figure 6:
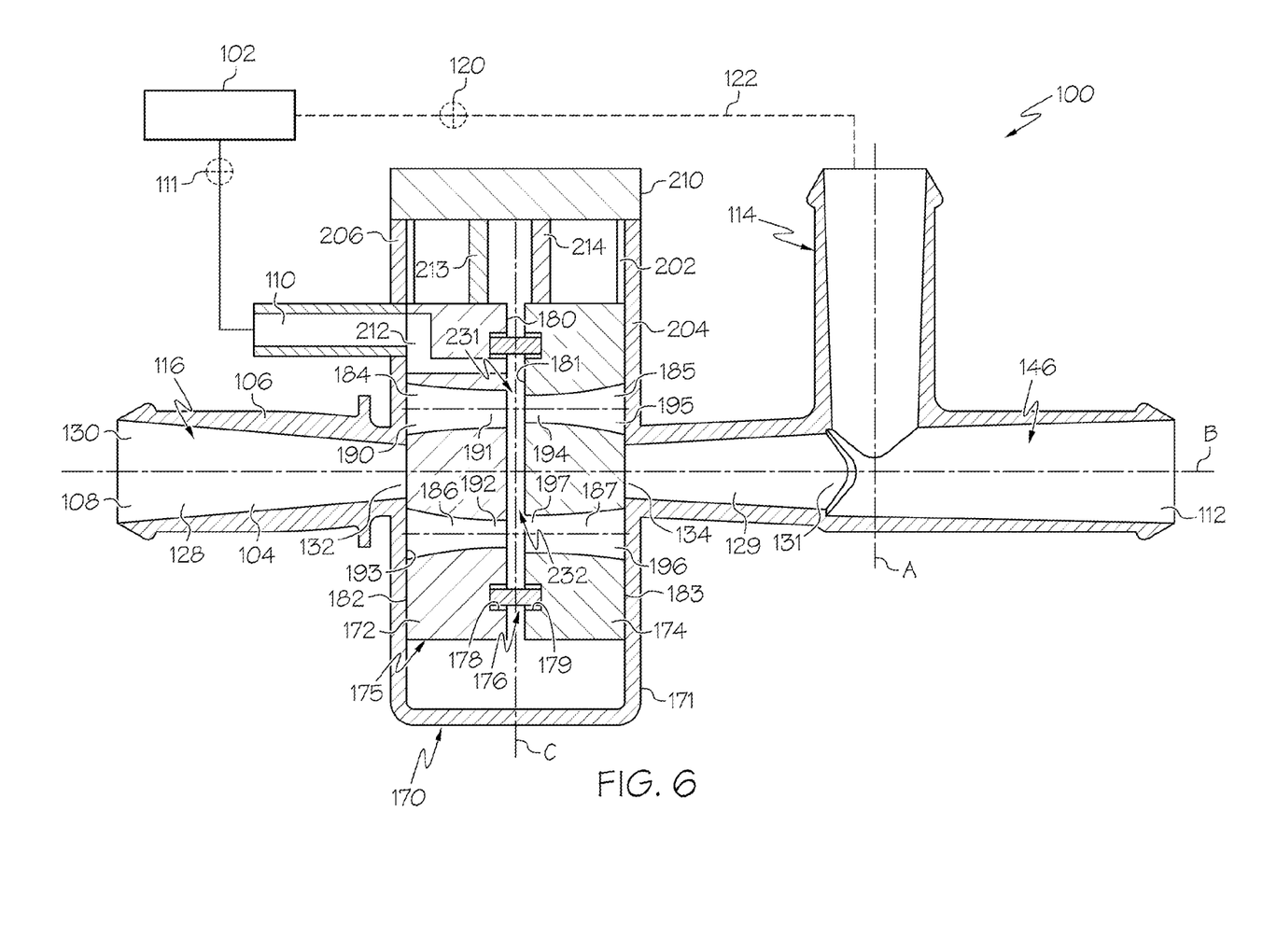
FIG. 6 is a side, longitudinal cross-sectional view of one embodiment of an aspirator having a gate providing bi-directional control of the Venturi effect therein.

FIGS. 5-6 illustrate an embodiment of an aspirator 100 for use in an engine system 10, for example, in a vehicle's engine. Referring to FIG. 5, the engine system 10 may include a turbocharger compressor 20 having an inlet 26 and an outlet 28, an intake manifold 22, and an air induction system 23. The engine system 10 may also have a recirculation pathway 11 in fluid communication with the inlet 26 and outlet 28 of the turbocharger compressor 20. The aspirator 100 may be positioned in recirculation pathway 11. In one embodiment, an optional check valve 30 may be positioned in the recirculation pathway 11. The optional check valve 30 may be positioned on either side of the aspirator assembly 100.

Referring now to FIG. 6, aspirator 100 includes a body 106 defining passageway 104, having three or more ports that are connectable to an engine, and a gate assembly 170 providing bi-directional control to the flow through passageway 104. As shown in FIG. 6, the ports include: (1) a motive port 108, which supplies clean air from the engine intake air cleaner, obtained upstream of the throttle of the engine; (2) a suction port 110, which may connect via an optional check valve 111 to a device requiring vacuum 102; (3) a discharge port 112, which is connected to an engine intake manifold downstream of the throttle of the engine; and, optionally, (4) a bypass port 114. In one embodiment, the device requiring vacuum 102 is a vehicle brake boost device. The bypass port 114 may be connected to the device requiring vacuum 102 and, optionally, may include a check valve 120 in the fluid flow path 122 therebetween.

The passageway 104 of the aspirator 100 has a central longitudinal axis B labeled in FIG. 6. The passageway 104 includes a first tapering portion 128 in the motive section 116 of the body 106 coupled to a second tapering portion 129 in the discharge section 146 of the body 106. Here, the first tapering portion 128 and the second tapering portion 129 are aligned end to end (outlet end 132 of the motive section 116 to inlet end 134 of the discharge section) with the gate assembly 170 disposed therebetween to control the fluid communication between the motive section 116 and the discharge section 146. The inlet ends 130, 134 (or the outlet end 132, 131) may have a shape that is circular, elliptical, rectangular, or other polygonal shape and the gradually, continuously tapering inner profile extending therefrom may define, but is not limited to, a hyperboloid or a cone.

As seen in FIG. 6, the gate assembly 170 includes a gate housing 171, defining a gate passageway 202, and a gate 175 translatable within the gate passageway 202. The gate housing 171 may have a longitudinal axis C. The gate 175 is connected to an actuator 13 that operates to control the translation of the gate 175 within the gate passageway 202. The gate 175, which may be referred to herein as a sprung gate, includes a first gate member 172, a second gate member 174, (collectively referred to as gate 175) and biasing member received therebetween. In FIG. 6, the biasing member is shown to be an endless elastic band 176. The endless elastic band 176 may be described as being sandwiched between the first and second gate members 172, 174. Each gate member 172, 174 includes a track 178, 179 respectively as a portion of the surface facing the other gate member (herein referred to as the inner surfaces 180, 181). Each track 178, 179 has received therein (has seated therein) a portion of the endless elastic band 176. The endless elastic band 176 is a biasing member that biases the first and second gate members 172, 174 away from one another and as such biases their respective outer surfaces 182, 183 against opposing walls 204, 206 of the gate passageway 202 defined by the gate housing 171. The biasing force of the endless elastic band 176 may be a result of compression of the endless elastic band 176 between the first and the second gate members 172, 174.

Figure 7:
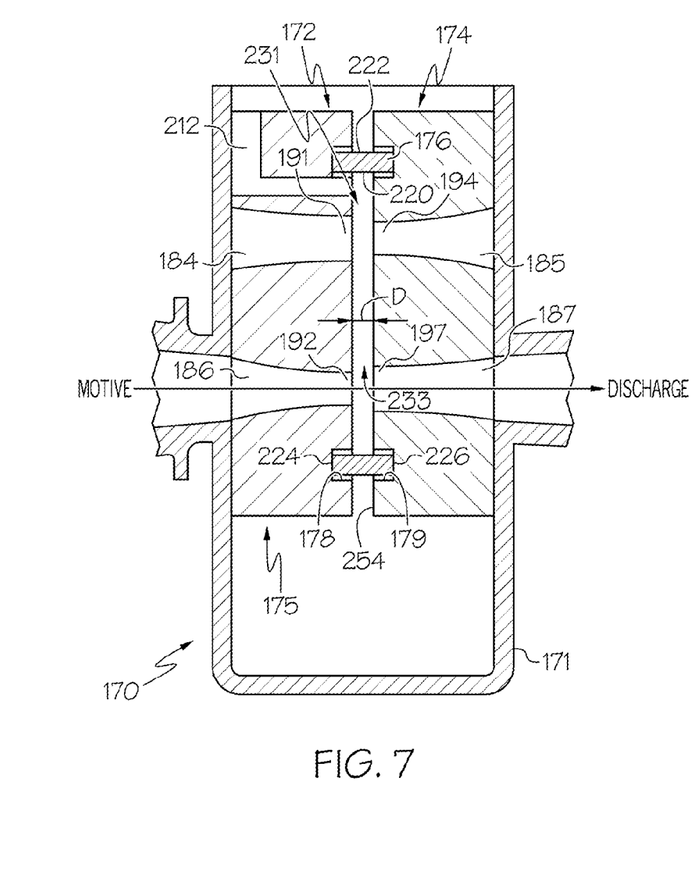
FIG. 7 is a side, longitudinal cross-sectional plan view of the gate portion of the aspirator of FIG. 6 illustrating the gate in a first Venturi effect position.

As labeled in FIG. 7, the endless elastic band 176 is generally oval-shaped and thereby includes an inner perimeter 220 defining an open space, an outer perimeter 222, and opposing first and second sides 224, 226. The endless elastic band 176 is received in the tracks 178, 179 of the first and second gate members 172, 174 with the first side 224 received in one track 178 and the second side 226 received in the other track 179. When the endless band 176 is seated in the tracks 178, 179, the first and the second gate members 172, 174 are spaced apart from one another by a distance D to define a gap. The gap enables fluid to flow against the endless elastic band 176, which is radially expandable, to expand the endless elastic band 176 radially outward to form a seal between the outer perimeter 222 of the endless elastic band 176 and a portion of the tracks 178, 179 in the first and second gate members 172, 174 as fluid flows through the gate 175 when it is in an open position, such as the first position illustrated in FIG. 7 and the second position illustrated in FIG. 8. This sealing engagement reduces or prevents fluid leakage into the actuator 210, which renders the gate 175 more leak resistant. The tracks 178,179 are positioned to inset the endless elastic band 176 a distance from the outer perimeter of the first and second gate members 172, 174 as well. This construction defines a channel 254 around the outer perimeter 222 of the endless elastic band 176 between the first and second gate members 172, 174 for fluid flow around the sprung gate 228 within the gate passageway 202.

The endless elastic band 176 also results in a gate that is less sensitive to manufacturing tolerances, in particular with respect to the dimensions of gate passageway 202. The gate passageway 202 is typically formed to have a width that is smaller than the unloaded width of the gate 175. Accordingly, the endless elastic band 176 becomes compressed between the first and second gate members 172, 174 as the gate 175 is inserted into the gate passageway 202 (or pocket). The endless elastic band's biasing action on the first and second gate members 172, 174 when inserted (wedged) into the pocket 202 biases each respective gate member into a sealing engagement with a wall of the pocket to reduce or prevent leaks.

Figure 8:
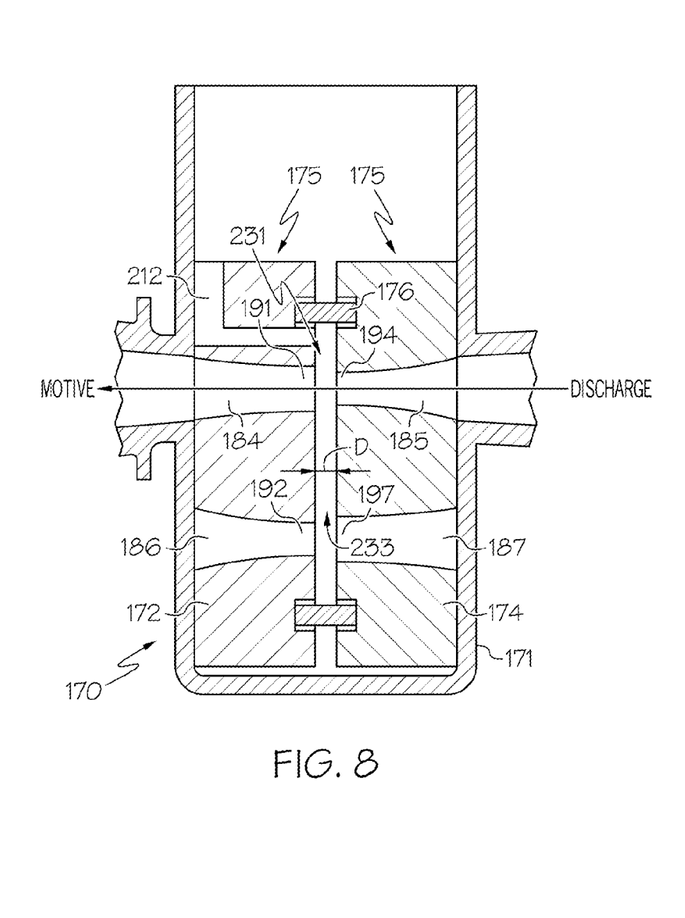
FIG. 8 is a side, longitudinal cross-sectional plan view of the gate portion of the aspirator of FIG. 6 illustrating the gate in a second Venturi effect position.

As illustrated in FIGS. 6-8, the first gate member 172 includes an upper bore 184 and a lower bore 186 therethrough. The upper and lower bores 184, 186 are oriented to pass through the first gate member 172 horizontally and each has a central longitudinal axis that is parallel to the longitudinal axis B of passageway 104. The upper bore 184 has an outlet 190 in the outer surface 182 and an inlet 191 in the inner surface 180 of the first gate member 172. The outlet 190 is larger than the inlet 191 and they both may have a shape that is circular, elliptical, rectangular, or other polygonal shape with the bore gradually, continuously tapering as it extends between the outlet 190 and the inlet 191, which may define, but is not limited to, a hyperboloid or a cone. The lower bore 186 has an outlet 192 in the inner surface 180 and an inlet 193 in the outer surface 182 of the first gate member 172. Here, the outlet 192 is smaller than the inlet 193 and they may both have a shape that is circular, elliptical, rectangular, or other polygonal shape, and the gradually, continuously tapering bore therebetween may define, but is not limited to, a hyperboloid of cone.

The second gate member 174 includes an upper bore 185 and a lower bore 187 therethrough. The upper and lower bores 185, 187 are oriented to pass through the second gate member 174 from left to right (or vice versa) as oriented relative to the page upon which the figures are printed and each have a central longitudinal axis that is parallel to the longitudinal axis B of passageway 104. The upper bore 185 has an outlet 194 in the inner surface 181 and an inlet 195 in the outer surface 183 of the second gate member 174. The outlet 194 is smaller than the inlet 195. the outlet 194 and the inlet 195 may have a shape that is circular, elliptical, rectangular, or other polygonal shape, and the gradually, continuously tapering bore extending therebetween may define, but is not limited to, a hyperboloid or a cone. The lower bore 187 has an outlet 196 in the outer surface 183 and the inlet 197 in the inner surface 181 of the second gate member 174. Here, the outlet 196 is larger than the inlet 197 and they both may have a shape that is circular, elliptical, rectangular, or other polygonal shape, and the gradually, continuously tapering bore extending therebetween may define, but is not limited to, a hyperboloid or a cone.

Referring to FIGS. 6-8, in operation the gate assembly 170 is operable to be translated generally perpendicular to the passageway 104. The translation of the gate 175 is enabled by an actuator 210 connected to first and second gate members 172, 174 by a first connecting member 213 and/or a second connecting member 214. The actuator 210 may be any device capable of moving the gate 175 between the various positions allowing flow within passageway 104 or blocking flow therein. In one embodiment, the actuator 210 may be a pneumatic actuator as disclosed in co-pending U.S. application Ser. No. 14/277,815, which was incorporated by reference above, a solenoid actuator as disclosed in co-pending U.S. application Ser. No. 14/473,151, which was incorporated by reference above, or a rotary to linear actuator as disclosed in U.S. Published Application 2012/0256111, which is incorporated herein by reference in its entirety. The gate 175 as illustrated in FIGS. 6-8 has at least three positions: (1) a blocked flow position shown in FIG. 6 where both the first gate member 172 and the second gate member 174 have a solid surface biased against the inlet 132 and the outlet 134, respectively, of passageway 104; (2) a motive to discharge flow position shown in FIG. 7 having the second bores 186, 187 in the first and second gate member 172, 174 aligned with one another and aligned with passageway 104 allowing flow from the motive port 108 to the discharge port 112 by passing through the gate 175; and (3) a discharge to motive flow position shown in FIG. 8 having the first bores 184, 185 in the first and the second gate members 172, 174 aligned with one another and aligned with passageway 104 allowing flow from the discharge port 112 to the motive port 108 by passing through the gate 175.

The aspirator 100 in operation creates a Venturi effect as fluid flows through either the first bores 184, 185 or the second bores 186, 187 of the gate 175. Referring to FIG. 7, flow through the second bores 186, 187 is meant for flow from the motive port 108 toward the discharge port 112. In FIG. 7, the first bores 184, 185 are shown as being the upper bores and the second bores 186, 187 are shown as being the lower bores relative to the orientation of the drawing. This is done for convenience and is not intended to limit the scope of the disclosure. Here, the first tapering portion 128 continuously tapers from a larger inlet end 130 at the motive port 108 to the outlet 192 of the second bore 186 in the first gate member 172, which is smaller than the inlet end 130. This change in profile along the motive section 116 of passageway 104 and the second bore 186 causes the flow of fluid to increase speed as it passes therethrough. The inlet end 130 and the outlet 192 may have a shape that is circular, elliptical, rectangular, or other polygonal shape and the gradually, continuously tapering inner profile extending therebetween may define, but is not limited to, a hyperboloid or a cone. The respective profiles of the inlet end 130 and the outlet 192 determine how much speed the motive air gains as it travels through the aspirator 100.

At the outlet 192 fluid flow opens into the gap having distance D between the first and second gate members 172, 174 and then into the inlet 197 of the second bore 187 of the second gate member 174, which is larger than the outlet 192. Since the second bores 186, 187 through the gate 175 have a change in profile in the inner surfaces 180, 181 of the first and second gate members 172, 174, at the gap therebetween, the gap constitutes a Venturi opening 233 that creates suction around it as fluid flows through the second bores from the motive port 108 toward the discharge port 112. From the inlet 197, the inner profile of the second tapering portion 129, including the second bore 187 of the second gate member 174, tapers gradually, continuously to an even larger discharge outlet 112. The inlet 197 and the discharge outlet 112 may have a shape that is circular, elliptical, rectangular, or other polygonal shape, and the gradually, continuously tapering inner profile extending therebetween may define, but is not limited to, a hyperboloid or a cone. The first tapering portion 128, second tapering portion 129, and second bores 186, 187 collectively make up a Venturi tube. The suction generated at the Venturi opening 233 is communicated to the gate passageway 202, which may be in fluid communication with a suction port 110 through a vent 212 in the first gate member 172, to draw additional fluid from the suction port 110 into the second bore 187 of the second gate member 174. While the vent 212 is illustrated as being in the first gate member 172, it may conversely be positioned in the second gate member 174.

Now referring to FIG. 8, flow through the first bores 184, 185 is meant for flow from the discharge port 112 toward the motive port 108. Here, the tapering portion 129 continuously tapers from a larger end 131 to the outlet 194 of the first bore 185 in the second gate member 174, which is smaller than the larger end 131. This change in profile along the tapering portion 129 and the first bore 185 causes the flow of fluid to increase speed as it passes therethrough. The larger end 131 and the outlet 194 may have a shape that is circular, elliptical, rectangular, or other polygonal shape, and the gradually, continuously tapering inner profile extending therebetween may define, but is not limited to, a hyperboloid or a cone. The respective profiles of the larger end 131 and the outlet 194 determine how much speed the motive air gains as it travels through the aspirator 100.

At the outlet 194 fluid flow opens into the gap having distance D between the first and second gate members 172, 174 and then into the inlet 191 of the first bore 184 in the first gate member 172, which is larger than the outlet 194. Since the first bores through the gate 175 have a change in profile in the inner surfaces 180, 181 of the first and second gate members 172, 174 at the gap therebetween, the gap constitutes a Venturi opening 231 that creates suction around it as fluid flows through the first bores from the discharge port 112 toward the motive port 108. From the inlet 191, the inner profile of the first tapering portion 128, including the first bore 184 of the first gate member 172, tapers gradually, continuously to an even larger profile at the motive port opening 130. The inlet 191 and the motive port opening 130 may have a shape that is circular, elliptical, rectangular, or other polygonal shape, and the gradually, continuously tapering profile extending therebetween may define, but is not limited to, a hyperboloid or a cone. The second tapering portion 129, first tapering portion 128, and the first bores 184, 185 collectively make up a Venturi tube. The suction generated at the Venturi opening 231 is communicated to the gate passageway 202, which may be in fluid communication with a suction port 110 through a vent 212 in the first gate member 172, to draw additional fluid from the suction port 110 into the first bore 184 of the first gate member 172. While the vent 212 is illustrated as being in the first gate member 172, it may conversely be positioned in the second gate member 174.

The optional bypass port 114 of the aspirator 100 may intersect the discharge section 146 as described above to be in fluid communication with the second tapering section 129. As illustrated in FIG. 6, the bypass port 114 may intersect the second tapering section 129 adjacent to, but downstream of the outlet end 131. The body 106 may thereafter, i.e., downstream of this intersection of the bypass port, continue with a cylindrically uniform inner profile until it terminates at the discharge port 112 or may be a tapering bore having a gradually, continuously tapering interior surface from the outlet end 131 of the second tapering section 129 to the port 112. A tapering bore in this section of body 106 may improve performance of the bypass port 114. Each of the respective ports 108, 110, 112, and 114 may include a connector feature on the outer surface thereof for connecting the aspirator 100 to hoses or other features in the engine. In the embodiment of FIG. 6, the gate passageway 202 has a central longitudinal axis C generally perpendicular to the body's central longitudinal axis B, and the optional bypass port 114 may likewise have a central longitudinal axis A that is generally perpendicular to the body's central longitudinal axis B.

Although the invention is shown and described with respect to certain embodiments, it is obvious that modifications will occur to those skilled in the art upon reading and understanding the specification, and the present invention includes all such modifications.

What is claimed is:

1. A system comprising:
a turbocharger compressor having an inlet and an outlet;
a recirculation pathway connecting fluid flow from the outlet of the turbocharger compressor to fluid flow into the inlet of the turbocharger compressor;
an aspirator assembly positioned in the recirculation pathway, wherein the aspirator assembly produces vacuum when the fluid flow is through the recirculation pathway from the inlet to the outlet and when the fluid flow is through the recirculation pathway from the outlet to the inlet; and
a recirculation valve assembly controlling fluid flow through the recirculation pathway and the aspirator assembly, the recirculation valve assembly comprising:
an electropneumatic actuator operating a valve coupled to the aspirator assembly, wherein the valve is a three-way valve having a first open position to direct fluid flow through the aspirator assembly when the fluid flow is through the recirculation pathway from the inlet to the outlet, a second open position to direct fluid flow through the aspirator assembly when the fluid flow is through the recirculation pathway from the outlet to the inlet, and a closed position;
wherein the vacuum generated by the aspirator assembly is ire fluid communication with a device requiting vacuum.

2. The system of claim 1, wherein the fluid flow through the recirculation pathway from the outlet to the inlet occurs when the turbocharger compressor generates boost.

3. The system of claim 2, wherein the vacuum produced during boost actuates the electropneumatic actuator to move the valve to a closed position.

4. The system of claim 1, wherein the device requiring vacuum is the electropneumatic actuator.

5. The system of claim 1, wherein the electropneumatic actuator is actuated by less than 1 ampere of current.

6. The system of claim 1, wherein the aspirator assembly further comprises a first selectable portion having a first aspirator and a second selectable portion having a second aspirator, wherein the first aspirator creates vacuum for fluid flow through the recirculation pathway from the outlet to the inlet and the second aspirator creates vacuum for fluid flow through the recirculation pathway from the inlet to the outlet.

7. The system of claim 6, further comprising:
a first check valve in the first selectable portion of the recirculation pathway to prevent fluid flow into the first selectable portion when the valve directs flow through the second selectable portion; and
a second check valve in the second selectable portion of the recirculation pathway to prevent fluid flow through the second selectable portion when the valve directs flow through the first selectable portion.

8. A system comprising:
a turbocharger compressor having an inlet and an outlet;
a recirculation pathway connecting fluid flow from the outlet of the turbocharger compressor to fluid flow into the inlet of the turbocharger compressor; and
a recirculation valve assembly controlling fluid flow through the recirculation pathway, the recirculation valve assembly comprising an electropneumatic actuator operating a valve coupled to an aspirator assembly that produces vacuum when the fluid flows through the recirculation pathway from the inlet to the outlet and when the fluid flows through the recirculation pathway from the outlet to the inlet, wherein the vacuum generated by the aspirator assembly is in fluid communication with a device requiring vacuum;
a reservoir in fluid communication with the aspirator assembly and the electropneumatic actuator, wherein the reservoir stores vacuum for selective activation of the electropneumatic actuator; and
a control valve disposed between the reservoir and the electropneumatic actuator, wherein the control valve is activatable by an engine computer on demand to apply vacuum to the electropneumatic actuator to operate the valve.

9. A system comprising:
a turbocharger compressor having an inlet and an outlet;
a recirculation pathway connecting fluid flow from the outlet of the turbocharger compressor to fluid flow into the inlet of the turbocharger compressor: and
a recirculation valve assembly controlling fluid flow through the recirculation pathway, the recirculation valve assembly comprising:
an electropneumatic actuator operating a valve coupled to an aspirator assembly that produces vacuum when the fluid flows through the recirculation pathway from the inlet to the outlet and when the fluid flows through the recirculation pathway from the outlet to the inlet:
wherein the vacuum generated by the aspirator assembly is in fluid communication with a device requiring vacuum; and
wherein the valve is integrated into the aspirator assembly and is translatable between at least a first position and a second position that each provide a Venturi effect, but in opposite directions of flow through the aspirator assembly.

10. The system of claim 9, Wherein the valve comprises:
a gate having a first bore and a second bore, wherein the first bore has a Venturi opening that produces vacuum when the fluid flows from the inlet to the outlet, wherein the second bore has a Venturi opening that produces vacuum when the fluid flows from the outlet to the inlet; and wherein the electropneumatic actuator operates to move the gate to place the first bore or the second bore, as selected, into alignment with the recirculation pathway to define the first position and the second position of the valve.

11. The system of claim 10, wherein the first bore and the second bore of the gate taper to be part of a Venturi tube of the aspirator assembly.

12. A system comprising:
a turbocharger compressor having an inlet and an outlet;
a recirculation pathway connecting fluid flow from the outlet of the turbocharger compressor to fluid flow into the inlet of the turbocharger compressor;
a recirculation valve assembly controlling fluid flow through the recirculation pathway, the recirculation valve assembly comprising:
a housing defining a fluid passageway therethrough, the fluid passageway comprising:
a first tapering portion gradually tapering from a larger internal opening to a smaller internal opening;
a second tapering portion gradually tapering from a larger internal opening to a smaller internal opening;
wherein the first tapering portion and the second tapering portion converge toward one another with their smaller internal openings facing one another;
a gate positioned between and in fluid communication with the first tapering portion and the second tapering portion of the housing, the gate having a first bore therethrough that includes a Venturi opening within a portion of the first bore that creates vacuum when fluid flows through the first bore and a second bore therethrough that includes a Venturi opening within a portion of the second bore that creates vacuum when fluid flows through the second bore; and
an electropneumatic actuator coupled to the gate, the actuator operable to move the gate to place the first bore or the second bore, as selected, into alignment with the smaller internal openings of the first and second tapering portions, wherein the vacuum generated by the recirculation valve assembly is in fluid communication with a device requiring vacuum.

13. The system of claim 12, wherein the Venturi opening in the first bore creates a vacuum when fluid flows from the first tapering portion to the second tapering portion of the fluid passageway and the Venturi opening in the second bore creates a vacuum when fluid flows from the second tapering portion to the first tapering portion of the fluid passageway.

14. The system of claim 13, wherein the fluid flows through the recirculation pathway from the outlet to the inlet when the turbocharger compressor generates boost, and the vacuum produced during boost actuates the electropneumatic actuator to move the valve to a closed position.

15. The system of claim 12, wherein the electropneumatic actuator is actuated by less than 1 ampere of current.

16. A valve assembly for creating vacuum comprising:
a first flow path having a first aspirator that creates vacuum for fluid flow through the first flow path;
a second flow path having a second aspirator that creates vacuum for fluid flow through the second flow path;
a valve in fluid communication with an inlet, the first flow path, and the second flow path; and
an actuator coupled to the valve and operable to actuate the valve to place the first flow path or the second flow path, as selected, in fluid communication with the inlet, wherein the vacuum generated by the valve assembly is in fluid communication with a device requiring vacuum;
wherein the valve comprises:
a housing having a first inlet, a second inlet, a first outlet in fluid communication with the first flow path, a second outlet in fluid communication with the second flow path, and a gate passageway; and
a gate translatable within the gate passageway, the gate having a bore therethrough, and wherein the actuator is coupled to the gate to translate the gate between a first position, in which the bore fluidly connects the first inlet to the first outlet, and a second position, in which the bore fluidly connects the second inlet to the second outlet.

17. The valve assembly of claim 16, wherein the first aspirator creates vacuum for fluid flow through the first flow path in a first direction relative to the valve, and the second aspirator creates vacuum for fluid flow through the second flow path in a second direction opposite the first direction.

18. The valve assembly of claim 16, further comprising:
a first check valve disposed in the first flow path to prevent fluid flow therethrough when the valve is positioned for fluid flow through the second flow path; and
a second check valve disposed in the second flow path to prevent fluid flow therethrough when the valve is positioned for fluid flow through the first flow path.

19. The valve assembly of claim 16, wherein the actuator actuates the gate to a third position in which the bore is not aligned with either the first flow path or the second flow path.

20. The valve assembly of claim 16, wherein the device requiring vacuum is the actuator.

* * * * *

UNITED STATES PATENT AND TRADEMARK OFFICE
CERTIFICATE OF CORRECTION

PATENT NO. : 9,822,785 B2
APPLICATION NO. : 14/566246
DATED : November 21, 2017
INVENTOR(S) : Fletcher et al.

It is certified that error appears in the above-identified patent and that said Letters Patent is hereby corrected as shown below:

In the Claims

Column 13, Claim 1, Line 53, the phrase "ire fluid communication with a device requiting" should be corrected to read "in fluid communication with a device requiring".

Signed and Sealed this
Fifteenth Day of May, 2018

Andrei Iancu
*Director of the United States Patent and Trademark Office*